US009827559B2

United States Patent
Jiang et al.

(10) Patent No.: US 9,827,559 B2
(45) Date of Patent: Nov. 28, 2017

(54) METHOD FOR PREPARING NANO METAL/METAL OXIDE LOADED MOLECULAR SIEVE CATALYST

(71) Applicant: CHANGZHOU UNIVERSITY, Changzhou (CN)

(72) Inventors: Xingmao Jiang, Changzhou (CN); Long Sun, Changzhou (CN); Chuanling Chen, Changzhou (CN); Zhen Chen, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 267 days.

(21) Appl. No.: 14/952,295

(22) Filed: Nov. 25, 2015

(65) Prior Publication Data

US 2016/0074849 A1   Mar. 17, 2016

Related U.S. Application Data

(63) Continuation of application No. PCT/CN2013/087202, filed on Nov. 15, 2013.

(30) Foreign Application Priority Data

May 28, 2013  (CN) .......................... 2013 1 0208234

(51) Int. Cl.
*B01J 23/28* (2006.01)
*B01J 29/46* (2006.01)
(Continued)

(52) U.S. Cl.
CPC .............. *B01J 29/46* (2013.01); *B01J 23/28* (2013.01); *B01J 23/44* (2013.01); *B01J 23/745* (2013.01);
(Continued)

(58) Field of Classification Search
CPC ... B01J 29/44; B01J 29/60; B01J 29/63; B01J 29/7007; B01J 29/7215; B01J 29/83;
(Continued)

(56) References Cited

U.S. PATENT DOCUMENTS

2006/0166811 A1    7/2006  Huang et al.
2009/0239739 A1*   9/2009  Yasuda .............. B01D 53/9413
                                               502/241

(Continued)

FOREIGN PATENT DOCUMENTS

| CN | 101664682 A | 3/2010 |
| CN | 102266771 A | 12/2011 |
| CN | 103272634 A | 9/2013 |

OTHER PUBLICATIONS

Synthesis of materials within reverse Micelles, Uskokovic et al. Surface Review and Letters, 12 (2), 2005: 239-277.*

(Continued)

*Primary Examiner* — Jun Li
(74) *Attorney, Agent, or Firm* — Anova Law Group, PLLC

(57) ABSTRACT

The present disclosure provides a method for preparing a molecular sieve catalyst. A water-in-oil micro-emulsion including a continuous phase containing an organic solvent and a dispersed phase containing an aqueous solution containing one or more metal salts and a water-soluble organic carbon source is prepared, hydrolyzed, and azeotropically distilled to form a mixture solution. The mixture solution is heated to carbonize the water-soluble organic carbon source to form nanoparticles each having a core-shell structure including a carbon-shelled metal-oxide. The nanoparticles containing the carbon-shelled metal-oxide are dispersed in a molecular sieve precursor solution. A nanoparticle-loaded molecular sieve is formed from the molecular sieve precur- (Continued)

sor solution containing the nanoparticles, and then calcined to remove carbon there-from to form a metal-oxide loaded molecular sieve.

18 Claims, 7 Drawing Sheets

(51) Int. Cl.
| | |
|---|---|
| *B01J 29/06* | (2006.01) |
| *B01J 23/44* | (2006.01) |
| *B01J 23/745* | (2006.01) |
| *B01J 23/755* | (2006.01) |
| *B01J 23/89* | (2006.01) |
| *B01J 29/40* | (2006.01) |
| *B01J 29/44* | (2006.01) |
| *B01J 29/60* | (2006.01) |
| *B01J 29/63* | (2006.01) |
| *B01J 29/70* | (2006.01) |
| *B01J 29/72* | (2006.01) |
| *B01J 29/83* | (2006.01) |
| *B01J 29/85* | (2006.01) |
| *B01J 29/89* | (2006.01) |
| *B01J 35/00* | (2006.01) |
| *B01J 37/03* | (2006.01) |
| *B01J 37/06* | (2006.01) |
| *B01J 37/08* | (2006.01) |
| *B01J 37/16* | (2006.01) |
| *B01J 37/18* | (2006.01) |

(52) U.S. Cl.
CPC ......... *B01J 23/755* (2013.01); *B01J 23/8906* (2013.01); *B01J 23/8913* (2013.01); *B01J 23/8926* (2013.01); *B01J 29/061* (2013.01); *B01J 29/40* (2013.01); *B01J 29/44* (2013.01); *B01J 29/60* (2013.01); *B01J 29/63* (2013.01); *B01J 29/7007* (2013.01); *B01J 29/7215* (2013.01); *B01J 29/83* (2013.01); *B01J 29/85* (2013.01); *B01J 29/89* (2013.01); *B01J 35/0006* (2013.01); *B01J 37/031* (2013.01); *B01J 37/06* (2013.01); *B01J 37/08* (2013.01); *B01J 37/16* (2013.01); *B01J 37/18* (2013.01)

(58) Field of Classification Search
CPC ... B01J 29/85; B01J 29/89; B01J 23/28; B01J 23/38; B01J 23/40; B01J 23/42; B01J 23/44; B01J 23/8913; B01J 23/8906; B01J 23/8926
See application file for complete search history.

(56) References Cited

U.S. PATENT DOCUMENTS

2010/0010271 A1* 1/2010 Huang ................... B01J 23/002
568/671
2014/0100404 A1* 4/2014 Narula ..................... C10G 3/45
585/733

OTHER PUBLICATIONS

Machine translation of CN101664682 A (publication date Mar. 10, 2010).*
The World Intellectual Property Organization (WIPO) International Search Report for PCT/CN2013/087202 dated Mar. 6, 2014.
Zhou Shuitian et al. Effect of Rhodium Particle Size in Rh/SiO2 Catalyst Prepared by Microemulsion Method on Reaction Performance of CO Hydrogenation[J] Chinese Journal of Catalysis, 2006,V27(6): 474-478, ISSN: 0253-9837.

* cited by examiner

METHOD FOR PREPARING NANO METAL/METAL OXIDE LOADED MOLECULAR SIEVE CATALYST

CROSS-REFERENCES TO RELATED APPLICATIONS

This application is a continuation of PCT patent application No. PCT/CN2013/087202, filed on Nov. 15, 2013, which claims priority to Chinese Patent Application No. 201310208234.0, filed on May 28, 2013, the entire content of all of which is incorporated by reference herein.

FIELD OF THE DISCLOSURE

The present disclosure generally relates to field of inorganic and catalytic chemistry and, more particularly, relates to a method for preparing molecular sieve catalyst with simultaneous control of size, composition, and crystal phase of nanoparticles loaded in the molecular sieve catalyst.

BACKGROUND

Conventional methods for forming metal loaded catalyst generally include an impregnation method, an ion exchange method, and a thermal decomposition method. In some cases, metal may be loaded on a zeolite molecular sieve. The zeolite molecular sieve has a porous structure to provide a high hydrothermal stability and a desired material diffusion capability, and is often used in petroleum, fine chemical and other fields.

However, when being loaded on a zeolite molecular sieve using existing methods, metals/metal-oxides/metal alloys and their compositions, sizes and crystal phases may not be simultaneously controlled. In addition, high-temperature reaction may often be used and may promote metal agglomeration, making it difficult to understand and to study synergy effect between catalyst metals, catalytic active center, and catalytic reaction mechanism. Further, when used in petrochemicals, fine chemicals industry, loaded molecular sieve prepared by conventional methods may limit mass transfer in the catalytic reaction and may limit application of macromolecules involved in the catalytic reaction.

BRIEF SUMMARY OF THE DISCLOSURE

One aspect of the present disclosure provides a method for preparing a molecular sieve catalyst. In the method, a water-in-oil micro-emulsion including a continuous phase containing an organic solvent and a dispersed phase containing an aqueous solution containing one or more metal salts and a water-soluble organic carbon source is prepared, hydrolyzed, and azeotropically distilled to form a mixture solution. The mixture solution is heated to carbonize the water-soluble organic carbon source to form nanoparticles each having a core-shell structure including carbon-shelled metal-oxide. The nanoparticles containing the carbon-shelled metal-oxide are dispersed in a molecular sieve precursor solution. A nanoparticle-loaded molecular sieve is formed from the molecular sieve precursor solution containing the nanoparticles, and then calcined to remove carbon there-from to form a metal-oxide loaded molecular sieve.

Optionally, the method further includes placing the metal-oxide loaded molecular sieve in a reduction environment to reduce metal oxide in the nanoparticle-loaded molecular sieve to form a molecular sieve loaded with one or more of metal, metal alloy, and intermetallic compound.

Optionally, the reduction environment includes a reducing gas selected from a group of carbon monoxide and hydrogen, and a concentration of the reducing gas ranges from about 3% to about 100% by volume.

Optionally, the water-in-oil micro-emulsion further includes a surfactant, and the surfactant includes a cationic surfactant including cetyl trimethyl ammonium bromide, an anionic surfactant including sodium dioctyl succinate, a nonionic surfactant including diethyl glucose amide, and a zwitterionic surfactant including diethyl phosphate choline.

Optionally, a mass ratio of the surfactant over water in the water-in-oil micro-emulsion is about 1:1 to about 1:500. A volume ratio of the organic solvent in the continuous phase over water in the water-in-oil micro-emulsion is about 10:1 to about 500:1. A mass ratio of the water-soluble organic carbon source over the one or more metal salts in the water-in-oil micro-emulsion is about 0.01:1 to about 200:1, such as about 0.01:1 to about 40:1. A mass ratio of water over the one or more metal salts in the water-in-oil micro-emulsion is about 1:1 to about 500:1.

Optionally, the organic solvent in the continuous phase includes one or more selected from a group of benzene, toluene, chloroform, carbon tetrachloride, petroleum ether, dimethyl sulfoxide, ethyl acetate, ethylene dichloride, xylene, and n-pentanol.

Optionally, a metal in each of the one or more metal salts and the carbon-shelled metal-oxide includes one or more selected from a group of Fe, Co, Ni, Cu, Ag, Au, Zn, Pd, Pt, Ce, Ti, Si, Cr, Mn, W, Zr, Nb, Mo, Ru, Rh, Cd, Sn, Y, La, and V. Optionally, the metal salt includes one or more selected from a group of ferric nitrate, nickel nitrate, ferric chloride, zinc nitrate, zinc chloride, cobalt nitrate, copper nitrate, copper chloride, silver nitrate, ammonium molybdate, and chloroplatinic acid.

Optionally, the step of hydrolyzing and azeotropically distilling the water-in-oil micro-emulsion includes: hydrolyzing the water-in-oil micro-emulsion at a temperature of about 50° C. to about 150° C. for about 0.5 hour to about 72 hours, and azeotropically distilling by heating to remove water from the hydrolyzed and azeotropically distilled water-in-oil micro-emulsion to form the mixture solution.

Optionally, the step of azeotropically distilling includes: an azeotropic system with water. The azeotropic system includes a binary or ternary azeotropic system including one or more selected from a group of benzene, toluene, chloroform, carbon tetrachloride, n-butanol, isobutanol, n-pentanol, isopentanol, acrylonitrile, xylene acetonitrile, isopropanol, ethyl ether, chlorine ethanol, carbon disulfide, formic acid, and ethyl acetate.

Optionally, the water-soluble organic carbon source includes one or more selected from a group of glucose, sucrose, cellulose.

Optionally, the step of heating the mixture solution to carbonize the water-soluble organic carbon source includes: healing the mixture solution to perform a hydrothermal reaction to carbonize the water-soluble organic carbon source at temperature of about 100° C. to about 200° C. for about 1 hour to about 24 hours.

Optionally, the nanoparticles containing the carbon-shelled metal-oxide include monodispersed nanoparticles.

Optionally, alter the step of heating the mixture solution to carbonize the water-soluble organic carbon source, the method further includes: washing the nanoparticles containing the carbon-shelled metal-oxide using an organic solvent, the organic solvent including one or more of isopropanol, ethanol, acetone, and water, and centrifuging the washed nanoparticles containing the carbon-shelled metal-oxide.

Optionally, the nanoparticles containing the carbon-shelled metal-oxide are dispersed in the molecular sieve precursor solution have a mass concentration of about 0.1% to 30% of a total mass of the molecular sieve precursor solution.

Optionally, the step of forming a nanoparticle-loaded molecular sieve from the molecular sieve precursor solution includes: a hydrothermal method, a dry gel method, or a microwave method.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
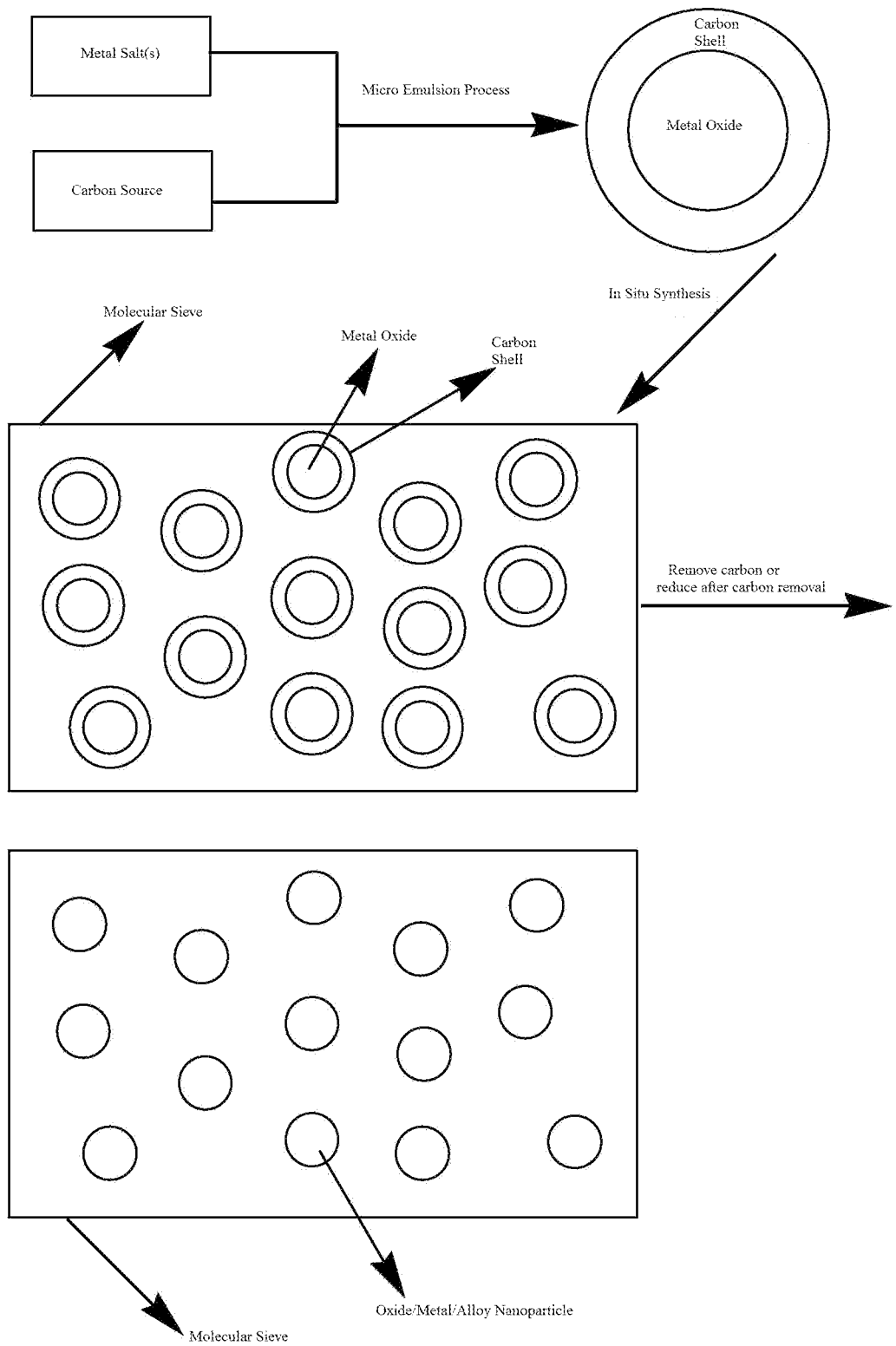
FIG. 1 illustrates an exemplary in situ synthesis process of a metal loaded molecular sieve in accordance with various embodiments of the present disclosure.

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

A method for preparing a molecular sieve catalyst is provided. The molecular sieve catalyst may include a nano metal/metal-oxide loaded molecular sieve.

For example, a water-in-oil micro-emulsion may be prepared. For example, a reverse micro-emulsion reaction system may be prepared to include a continuous phase containing an organic solvent; a dispersed phase containing an aqueous solution containing metal salt(s) and a water-soluble organic carbon source; and/or a surfactant to form a water-in-oil type micro-emulsion system.

In one embodiment, the reverse micro-emulsion reaction system may be hydrolyzed, e.g., at a temperature of about 50° C. to about 150° C. for about 0.5 hour to about 72 hours, then azeotropically distilled to remove water from the reverse micro-emulsion reaction system to form a water-removed mixture solution.

The water-removed mixture solution may be heated to react, e.g., at a temperature of about 100° C. to about 200° C. for about 1 hour to about 24 hours, such that the organic carbon source is carbonized to form monodispersed carbon-shelled metal-oxide nanoparticles each having a core-shell structure. The monodispersed carbon-shelled metal-oxide nanoparticles are then washed with water or an organic solvent including, for example, isopropanol, ethanol, and acetone, and centrifuged to form carbon-shelled metal-oxide nanoparticles.

The carbon-shell metal-oxide nanoparticles can be dispersed in a molecular sieve precursor solution. The carbon-shell metal-oxide particles may have a mass concentration of about 0.1% to 30% of a total mass of the molecular sieve precursor solution. A carbon-shelled metal-oxide loaded molecular sieve may be formed by processing the molecular sieve precursor solution containing the carbon-shell metal-oxide nanoparticles, followed by an air calcination process to remove carbon. Various methods for processing the molecular sieve precursor solution may be used, including a hydrothermal method, a dry gel method, a microwave method, and/or any suitable methods.

A molecular sieve catalyst loaded with metal, alloy, and/or intermetallic compound may be formed by reducing the metal-oxide loaded molecular sieve in a reduction atmosphere. The molecular sieve catalyst may be a microporous or mesoporous molecular sieve catalyst. The reduction atmosphere may include a reducing gas mixed with inert gas(es). The reduction atmosphere may have a concentration of a reducing gas, such as carbon monoxide and/or hydrogen, of about 3% to about 100% by volume, for example, at a reduction temperature of about 300° C. to about 700° C. for a hydrothermal reaction time of about 1 hour to about 24 hours.

For example, the surfactant and water may have a mass ratio of about 1:1 to about 1:500. The organic solvent of the continuous phase and water may have a volume ratio of about 10:1 to about 500:1. The organic carbon source and metal salt(s) may have a mass ratio of about 0.01:1 to about 200:1, such as about 0.01:1 to about 40:1. The water and the metal salt(s) may have a mass ratio of about 1:1 to about 500:1, such as about 1:1 to about 200:1.

In various embodiments, the organic solvent in the continuous phase may include benzene, toluene, chloroform, carbon tetrachloride, petroleum ether, dimethyl sulfoxide, ethyl acetate, ethylene dichloride, xylene, and/or n-pentanol. The metal salt may be one or more selected from a group of ferric nitrate, nickel nitrate, ferric chloride, zinc nitrate, zinc chloride, cobalt nitrate, copper nitrate, copper chloride, silver nitrate, ammonium molybdate, and chloroplatinic acid. The metal may be one or more selected from a group of Fe, Co, Ni, Cu, Ag, Au, Zn, Pd, Pt, Ce, Ti, Si, Cr, Mn, W, Zr, Nb, Mo, Ru, Rh, Cd, Sn, Y, La, and V.

In various embodiments, the azeotropic distillation includes an azeotropic system with water. The azeotropic system includes a binary or ternary azeotropic system including one or more selected from a group of benzene, toluene, chloroform, carbon tetrachloride, n-butanol, isobutanol, n-pentanol, isopentanol, acrylonitrile, xylene acetonitrile, isopropanol, ethyl ether, chlorine ethanol, carbon disulfide, formic acid, and ethyl acetate.

In various embodiments, the organic carbon source may include a water-soluble organic carbon source containing glucose, sucrose, and cellulose. The surfactant may include a cationic surfactant (e.g. cetyl trimethyl ammonium bromide), an anionic surfactant (e.g. sodium dioctyl succinate), nonionic surfactant (e.g. diethyl glucose amide), and/or a zwitterionic surfactant (e.g. diethyl phosphate choline).

In various embodiments, the step of forming a carbon-shelled metal-oxide loaded molecular sieve by processing the molecular sieve precursor solution containing the carbon-shelled metal-oxide particles may include a hydrothermal method, a dry gel method, or a microwave method.

As disclosed, the molecular sieve catalyst may include those used in the petrochemical or chemical industry. The molecular sieve may be a Si—Al molecular sieve, all-silicon molecular sieve, Ti—Si molecular sieve, P—Al molecular sieve, and/or Si—P—Al molecular sieve.

The metal(s) loaded in the molecular sieve catalyst may include Pt—Co, Pt—Ni, Pt—Cu, Pt—Co, Au—Ag, and/or Au—Cu. The metal(s) loaded in the molecular sieve catalyst may also include bicomponent, multicomponent alloys, intermetallic compounds, formed from a first group of Bi, Co, Mn, Pb, Cd, Ti, and/or Ce in combination of a second group of Pd, Au, and/or Pt.

The disclosed system may include CO oxidation at low temperatures; alloys/intermetallic compounds, containing Fe—Co, Ru—Co, Ru—Ti—Co, Fe—Pt, Co—Au, Co—R may include a Fischer-Tropsch (F-T) synthesis; while bicomponent, multicomponent alloys, intermetallic compounds, formed among Au, Ag, Pt, Fe, Co, Ni, and/or Cu may include a low-temperature vapor-phase methanol oxidation coupling reaction.

In this manner, an organic solvent, such as a nonpolar organic solvent, is used as a continuous phase, and a water solution including one or more metal salts and a water-soluble organic carbon source is used as a dispersed phase; and/or a surfactant is added to form a water-in-oil type micro-emulsion system. To continuously accelerate carbonization of the organic carbon source through azeotropic distilled water removing at a high temperature, carbon-shelled (or encapsulated) metal-oxide nanoparticles with a uniform size and a core-shell structure may be obtained. The carbon-shelled metal-oxide nanoparticles are washed by using an organic solvent and/or water and are dispersed in a molecular sieve precursor solution. After a hydrothermal synthesis or other suitable methods, the molecular sieve, within which carbon-shelled metal-oxide nanoparticles are uniformly distributed, are obtained; calcined; and/or reduced to obtain a nano metal/metal alloy loaded molecular sieve catalyst.

EXAMPLES

Example 1: $Fe_2O_3$ Loaded MFI-Type Molecular Sieve

In this example, materials used for the synthesis included: $Fe(NO_3)_3$ (ferric nitrate), glucose, CTAB (cetyl trimethyl ammonium bromide), benzene, isopropanol, TPABr (tetrapropylammonium bromide), NaOH (sodium hydroxide), $Al_2(SO_4)_3$ (aluminum sulfate), and TEOS (Tetraethyl orthosilicate).

To form a carbon-shelled metal-oxide, $Fe(NO_3)_3$ (e.g., about 1 g) and glucose (e.g., about 0.01 g) were added to a flask (e.g., a three-necked flask), followed by adding water (e.g., about 1 mL) to dissolve $Fe(NO_3)_3$ and glucose, and then adding CTAB (e.g., about 1 g) and toluene (e.g., about 500 mL) in the flask. The temperature in the flask was increased, e.g., to about 50° C., while being stirred by a magnetic stirrer, e.g., for about 72 hours. The temperature in the flask was continuously increased by being placed in an oil bath having a constant temperature. For example, the temperature of conductive oil in the oil bath may be increased to form an azeotropes in the flask, e.g., for about 24 hours, to remove water to form a mixture. The mixture after removing water was placed in a reactor, such as a PTFE-lined stainless steel reactor, for a hydrothermal reaction, e.g., at about a certain temperature for about 24 hours. The resultant solution after the hydrothermal reaction was washed (e.g., by isopropanol and water having a 1:1 volume ratio), centrifuged, and dried to provide the carbon-shelled metal-oxide.

To form a carbon-shelled metal-oxide nanoparticles, $Fe(NO_3)_3$ (e.g., about 1 g) and glucose (e.g., about 0.01 g) were added to a flask (e.g., a three-necked flask), followed by adding water (e.g., about 1 mL) to dissolve $Fe(NO_3)_3$ and glucose, and then adding CTAB (e.g., about 1 g) and toluene (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant solution. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain TPABr, $Na_2O$, $Al_2O_3$, $SiO_2$, and $H_2O$, having a molar ratio of TPABr:$Na_2O$:$Al_2O_3$:$SiO_2$:$H_2O$ of about 9.64:8.0:1.0:90:3206. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 5 hours) to provide a $Fe_2O_3$ loaded MFI (ZSM-5)-type molecular sieve.

FIG. 1 illustrates an exemplary in situ synthesis process of a metal loaded molecular sieve in accordance with various embodiments of the present disclosure. For example, the formed Fe₂O₃ loaded MFI-type molecular sieve may have a high degree of crystallinity.

Figure 2:
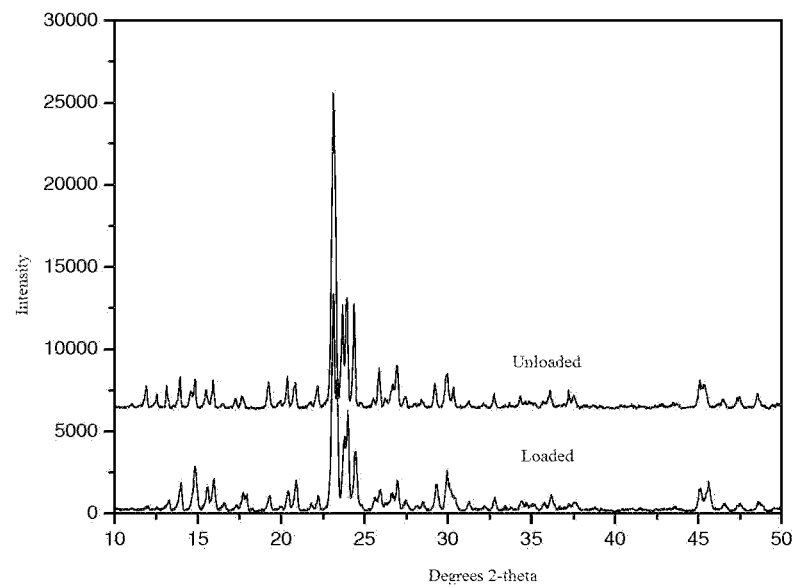
FIG. 2 compares X-ray powder diffraction (XRD) spectrum of a ZSM-5-type molecular sieve and $Fe_2O_3$ loaded ZSM-5-type molecular sieve in accordance with various embodiments of the present disclosure.

The XRD data in FIG. 2 illustrate a ZSM-5 structure. As shown in FIG. 2, compared with a typical ZSM-5 structure, the intensity of the peaks is changed due to introduction of the metal iron (Fe) within the molecular sieve.

Figure 3:
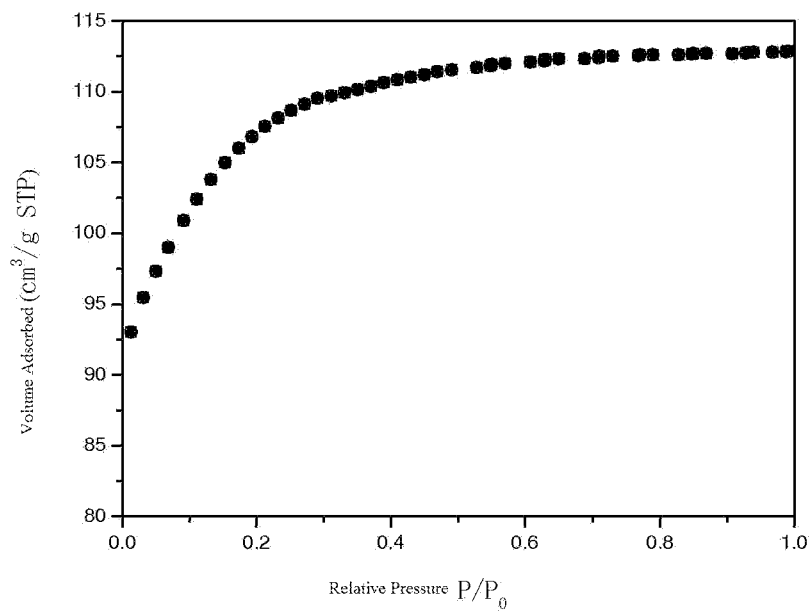
FIG. 3 illustrates a nitrogen adsorption-desorption curve for the $Fe_2O_3$ loaded ZSM-5-type molecular sieve in accordance with various embodiments of the present disclosure.
Figure 4:
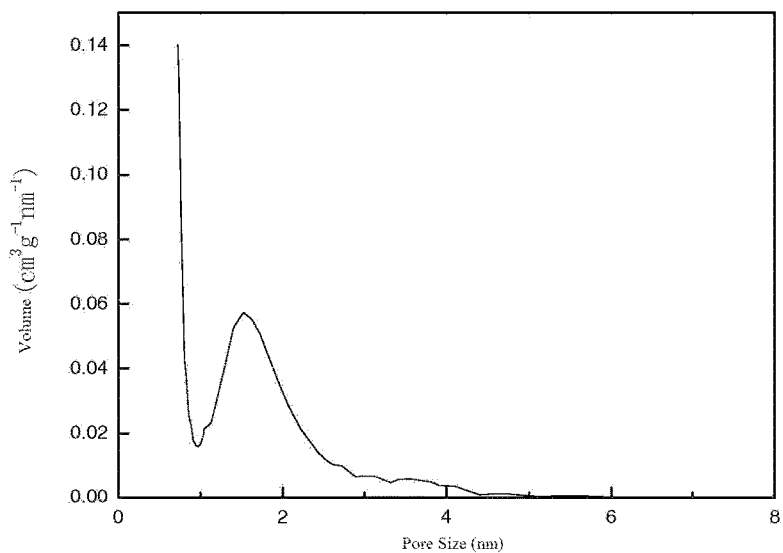
FIG. 4 illustrates a pore size distribution for the $Fe_2O_3$ loaded ZSM-5-type molecular sieve in accordance with various embodiments of the present disclosure.

FIG. 3 illustrates a nitrogen adsorption-desorption curve for Fe₂O₃ metal oxide loaded ZSM-5 structure, showing a microporous adsorption. FIG. 4 illustrates a BJH pore size distribution and, as shown, a partial molecular sieve has a mesoporous structure with a pore size of about 1 nm to about 3 nm. This may be due to removal of the carbon shell from the carbon-shelled metal-oxide during the calcination process.

Figure 5:
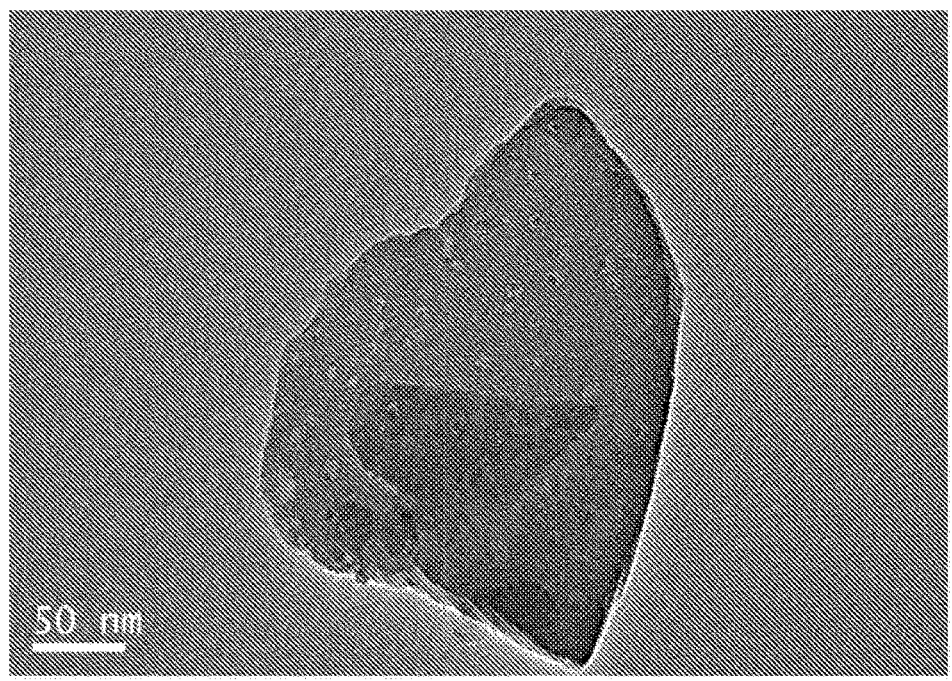
FIG. 5 illustrates a transmission electron microscopy (TEM) spectrum of the $Fe_2O_3$ loaded MFI (ZSM-5)-type molecular sieve in accordance with various embodiments of the present disclosure.

FIG. 5 is a TEM spectrum of the Fe₂O₃ loaded MFI (ZSM-5)-type molecular sieve after removal of the carbon shell by the calcination process. As can be clearly seen in FIG. 5, the loaded Fe₂O₃ nanoparticles are uniformly distributed within the ZSM-5 molecular sieve, rather than on the outer surface of the ZSM-5 molecular sieve.

Example 2: Fe₂O₃ Loaded MFI-Type Molecular Sieve

In this example, materials used for the synthesis included: Fe(NO₃)₃ (ferric nitrate), glucose, CTAB (cetyl trimethyl ammonium bromide), benzene, isopropanol, TPABr (tetrapropylammonium bromide), NaOH (sodium hydroxide), Al₂(SO₄)₃ (aluminum sulfate), and TEOS (Tetraethyl orthosilicate).

To form a carbon-shelled metal-oxide nanoparticles, Fe(NO₃)₃ (e.g., about 0.05 g) and glucose (e.g., about 2 g) were added to a flask (e.g., a three-necked flask), followed by adding water (e.g., about 10 mL) to dissolve Fe(NO₃), and glucose, and then adding CTAB (e.g., about 0.02 g) and toluene (e.g., about 100 mL) in the flask. The temperature in the flask was increased, while being stirred by a magnetic stirrer, e.g., for about 1 hour. The temperature in the flask was continuously increased as long as an azeotropes is formed, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain TPABr, Na₂O, Al₂O₃, SiO₂, and H₂O, having a molar ratio of TPABr:Na₂O:Al₂O₃:SiO₂:H₂O of about 9.64:8.0:1.0:90: 3206. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 5 hours) to provide a Fe₂O₃ loaded MFI (ZSM-5)-type molecular sieve.

Example 3: Pd-Loaded MFI-Type Molecular Sieve

In this example, materials used for the synthesis included: Pd(NO₃)₂ (palladium nitrate), glucose, CTAB (cetyl trimethyl ammonium bromide), benzene, isopropanol, TPABr (tetrapropylammonium bromide), NaOH (sodium hydroxide), Al₂(SO₄)₃ (aluminum sulfate), and TEOS (Tetraethyl orthosilicate).

To form a carbon-shelled metal-oxide nanoparticles, Pd(NO₃)₂ (e.g., about 1 g) and glucose (e.g., about 0.01 g) were added to a flask (e.g., a three-necked flask), followed by adding water (e.g., about 1 mL) to dissolve Pd(NO₃)₂ and glucose, and then adding CTAB (e.g., about 1 g) and toluene (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain TPABr, Na₂O, Al₂O₃, SiO₂, and H₂O, having a molar ratio of TPABr:Na₂O:Al₂O₃:SiO₂:H₂O of about 9.64:8.0:1.0:90: 3206.3. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 5 hours) to provide a metal oxide (e.g., PdO) loaded ZSM-5-type molecular sieve.

The metal oxide (e.g., PdO) loaded MFI (ZSM-5)-type molecular sieve was then processed at a reduction environment, e.g., including a mixture of H₂/Ar having about 3% of hydrogen by volume, at a temperature of about 300° C. for about 24 hours to provide a Pd loaded ZSM-5 type molecular sieve.

In this example, palladium oxide encapsulated by carbon was reduced at temperatures of about 300° C. and 500° C. respectively, for a total reduction time of about 8 hours.

Figure 7:
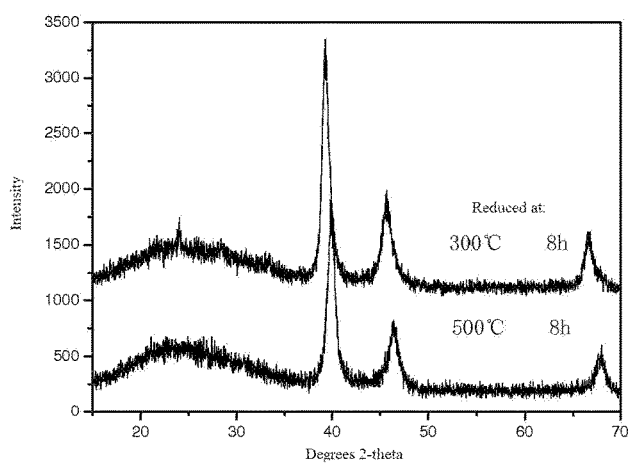
FIG. 7 illustrates XRD data of Pd nanoparticles reduced from PdO encapsulated by a carbon shell at different temperatures in accordance with various embodiments of the present disclosure.

The XRD data in FIG. 7 illustrate Pd nanoparticles having an unchanged size. In other words, Pd encapsulated by carbon in the core-shell structure is substantially stable at high temperatures, and the carbon shell may substantially completely encapsulate the metal Pd.

Figure 8:
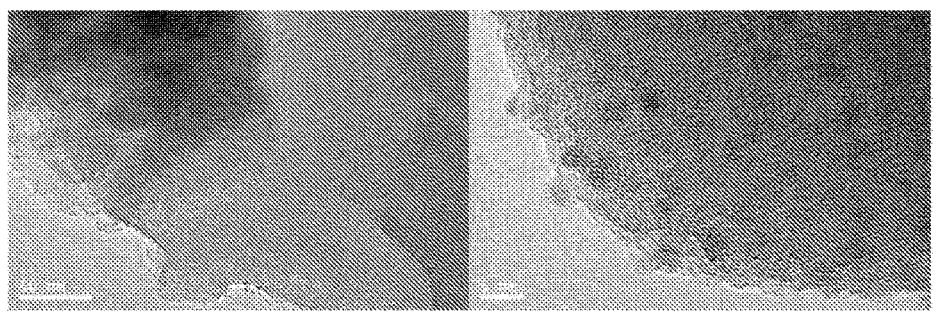
FIG. 8 illustrates TEM images of a Pd-loaded ZSM-5 molecular sieve in accordance with various embodiments of the present disclosure.

The TEM images in FIG. 8 indicate that metal Pd nanoparticles are highly dispersed and mono-dispersed inside the molecular sieve. The high-resolution TEM image shows that the metal Pd nanoparticles have an average particle size of about 2 nm to about 3 nm with a narrow particle size distribution. That is, the metal nanoparticles having a carbon shell can be monodispersed nanoparticles with high load of metal nanoparticles inside the molecular sieve. After the calcination removes the carbon shell and by chemical reduction, Pd-nanoparticles can be highly dispersed inside the molecular sieve rather than on the outer surface of the molecular sieve.

Figure 9:
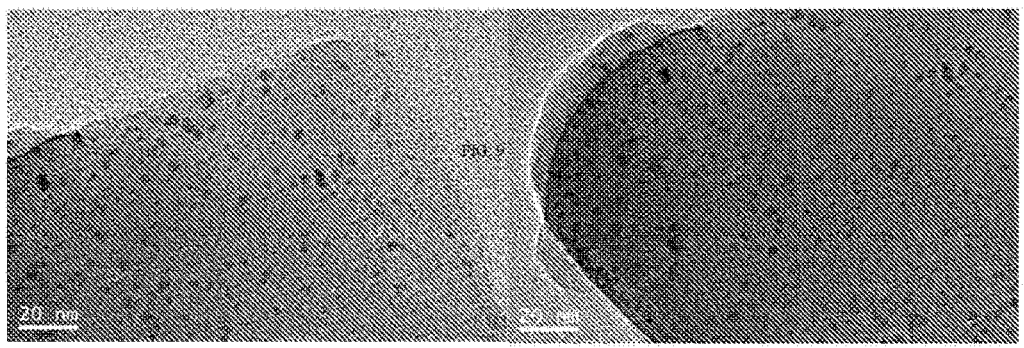
FIG. 9 illustrates TEM images of a Pd-loaded ZSM-5 molecular sieve reduced at high temperatures in accordance with various embodiments of the present disclosure.

The TEM images in FIG. 9 show resultant metal Pd nanoparticles after being reduced at a temperature of about 500° C. for a total time of about 8 hours. As shown, when reduced in the high temperature conditions, the metal Pd nanoparticles may partially grow and aggregate to have an average particle size up to about 4 nm to about 5 nm. This also indicates that the Pd nanoparticles have a high stability under high temperature conditions.

Figure 10:
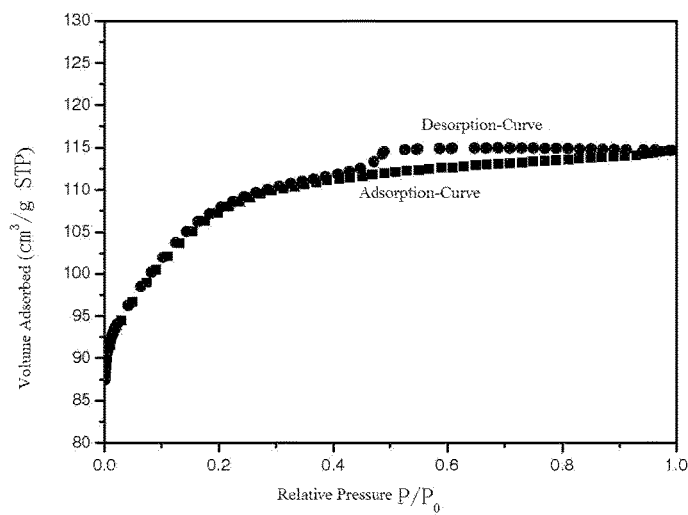
FIG. 10 illustrates a nitrogen adsorption-desorption curve for a Pd-loaded ZSM-5 molecular sieve in accordance with various embodiments of the present disclosure.

FIG. 10 illustrates a nitrogen adsorption-desorption curve for a Pd-loaded ZSM-5 molecular sieve. As shown, the adsorption-desorption isotherm curve of nitrogen at a low relative pressure region is a typical microporous adsorption-desorption isotherm curve (Langmuir isotherm), and hysteresis loop phenomenon occurs at a high relative pressure region. This indicates that the Pd-loaded ZSM-5 molecular sieve has a mesoporous structure. The mesoporous structure is formed due to carbon removal during the high-temperature calcination. This also indirectly proves that the carbon encapsulated nanoparticles are successful and effectively loaded within the ZSM-5 molecular sieve.

Figure 11:
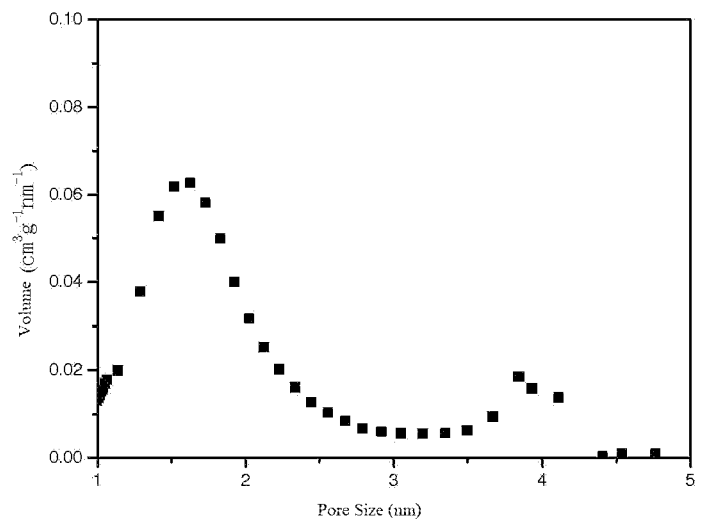
FIG. 11 illustrates a pore size distribution curve of a Pd-loaded ZSM-5 molecular sieve in accordance with various embodiments of the present disclosure.

FIG. 11 illustrates a pore size distribution curve of a Pd-loaded ZSM-5 type molecular sieve. As seen, the pore size has peaks at about 1.5 nm and at about 4 nm, each with a narrow pore size distribution. This may be because the carbon shell has different thicknesses. As the nanoparticles have a uniform particle size distribution, even if the thickness of the carbon film is different, little impact will affect the size of the metal nanoparticles. In the meantime, these meso-pores formed within the ZSM-5 type molecular sieve may facilitate reactant and product diffusion in catalytic reactions.

Example 4: Pd Loaded MFI-Type Molecular Sieve

In this example, materials used for the synthesis included: $Pd(NO_3)_2$ (palladium nitrate), glucose, CTAB (cetyl trimethyl ammonium bromide), benzene, isopropanol, TPABr (tetrapropylammonium bromide), NaOH (sodium hydroxide), $Al_2(SO_4)_3$ (aluminum sulfate), and TEOS (Tetraethyl orthosilicate).

To form a carbon-shelled metal-oxide nanoparticles, $Pd(NO_3)_2$ (e.g., about 0.05 g) and glucose (e.g., about 2 g) were added to a flask (e.g., a three-necked flask), followed by adding water (e.g., about 10 mL) to dissolve $Pd(NO_3)_2$ and glucose, and then adding CTAB (e.g., about 0.02 g) and toluene (e.g., about 100 mL) in the flask. The temperature in the flask was increased, e.g., to about 120° C., while being stirred by a magnetic stirrer, e.g., for about 1 hour. The temperature in the flask was continuously increased until an azeotropes is formed, e.g., for about 1 hour, to remove water to form a mixture. The mixture after removing water was placed in a reactor, such as a PTFE-lined stainless steel reactor, for a hydrothermal reaction. The resultant solution after the hydrothermal reaction was washed (e.g., by isopropanol and water having a 1:10 volume ratio), centrifuged, and dried to provide the carbon-shelled metal-oxide.

A molecular sieve mixture solution may contain TPABr, $Na_2O$, $Al_2O_3$, $SiO_2$, and $H_2O$, having a molar ratio of $TPABr:Na_2O:Al_2O_3:SiO_2:H_2O$ of about 9.64:8.0:1.0:90:3206.3. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 5 hours) to provide a metal oxide (e.g., PdO) loaded ZSM-5-type molecular sieve.

The metal oxide (e.g., PdO) loaded MFI (ZSM-5)-type molecular sieve was then processed at a reduction environment, e.g., including 100% reducing gas, such as carbon monoxide and/or hydrogen, by volume, at a temperature of about 700° C. for about 1 hour to provide a Pd loaded ZSM-5 type molecular sieve. The Pd loaded ZSM-5 type molecular sieve can be used as Pd loaded ZSM-S type molecular sieve catalysts.

Example 5: $NiFe_2O_4$ Metal Oxide and NiFe Metal Alloy Loaded MFI-Type Si—Al Molecular Sieve In this example, materials used for the synthesis included: $Ni(NO_3)_2$, $FeCl_3$, glucose, CTAB (cetyl trimethyl ammonium bromide), toluene, ethanol, TPABr (tetrapropylammonium bromide), NaOH (sodium hydroxide), $Al_2(SO_4)_3$ (aluminum sulfate), and silica sol (e.g., about 30% by mass weight).

To form a carbon-shelled metal-oxide nanoparticles, $Ni(NO_3)_2$ (e.g., about 0.5 g), $FeCl_3$ (e.g., about 0.5 g), and glucose (e.g., about 0.01 g) were added to a flask (e.g., a three-necked flask), followed by adding water (e.g., about 1 mL) to dissolve $Ni(NO_3)_2$ and glucose, and then adding CTAB (e.g., about 1 g) and toluene (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by ethanol and water having a 1:1 volume ratio), centrifuged, and dried to provide the carbon-shelled metal-oxide.

A molecular sieve mixture solution may contain TPABr, $Na_2O$, $Al_2O_3$, $SiO_2$, and $H_2O$, having a molar ratio of $TPABr:Na_2O:Al_2O_3:SiO_2:H_2O$ of about 9.64:8.0:1.0:90:3206.3. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 15 hours) to provide a metal oxide (e.g., $NiFe_2O_4$) loaded ZSM-5-type molecular sieve.

The metal oxide (e.g., $NiFe_2O_4$) loaded MFI (ZSM-5)-type molecular sieve was then processed at a reduction environment, e.g., including a mixture of $H_2$/He having about 3% of hydrogen by volume, at a temperature of about 700° C. for about 1 hour to provide a NiFe alloy loaded ZSM-5 type molecular sieve.

Figure 6:
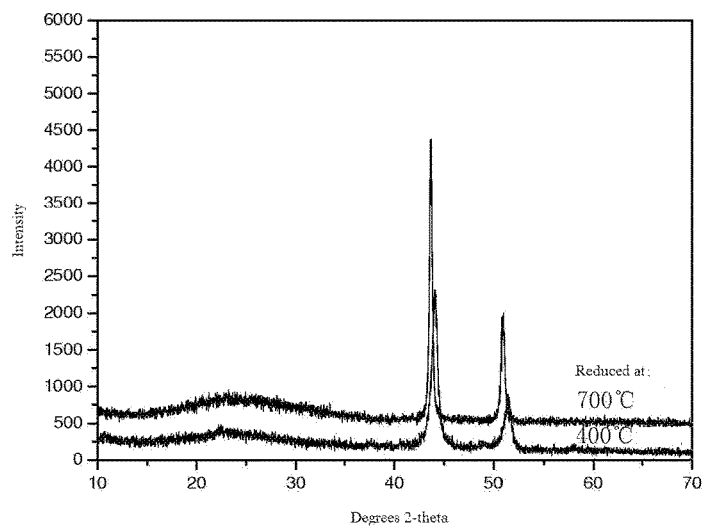
FIG. 6 illustrates XRD data of NiFe alloy reduced from NiFe-oxide encapsulated by a carbon shell at different temperatures in accordance with various embodiments of the present disclosure.

FIG. 6 illustrates XRD data of reduced NiFe-oxide (e.g., having the carbon shell) under a mixed gas atmosphere containing $H_2$/He having about 5% volume fraction of H2, respectively at a temperature of about 400° C. for 5 hours and at another temperature of about 700° C. for about 10 hours. As can be seen from the data in FIG. 6, a typical peak of amorphous carbon is at 15°-35°. When reduced at about 400° C., FeNi3 alloy having the carbon shell can be obtained with uniform/homogeneous alloy composition. When reduced at about 700° C., the resultant FeNi3 alloy can have a composition of $Fe_{0.64}Ni_{0.36}$, and the XRD data show a mono-alloy composition. In other words, the carbon-shelled metal-oxide prepared from a micro-emulsion system and reduced by a reducing gas may provide alloys with alloy composition and crystal phase that can be simultaneously controlled.

Example 6: $NiFe_2O_4$ Metal Oxide and NiFe Metal Alloy Loaded MFI-Type Si—Al Molecular Sieve In this example, materials used for the synthesis included: $Ni(NO_3)_2$, $FeCl_3$, glucose, CTAB (cetyl trimethyl ammonium bromide), toluene, ethanol. TPABr (tetrapropylammonium bromide), NaOH (sodium hydroxide), $Al_2(SO_4)_3$ (aluminum sulfate), and silica sol (e.g., about 30% by mass/weight).

To form a carbon-shelled metal-oxide nanoparticles, $Ni(NO_3)_2$ (e.g., about 0.025 g), $FeCl_3$ (e.g., about 0.025 g), and glucose (e.g., about 2 g) were added to a flask (e.g., a three-necked flask), followed by adding water (e.g., about 10 mL) to dissolve $Ni(NO_3)_2$ and glucose, and then adding CTAB (e.g., about 0.02 g) and toluene (e.g., about 100 mL) in the flask. The temperature in the flask was increased, e.g., to about 120° C., while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by ethanol and water having a 1:1 volume ratio), centrifuged, and dried to provide the carbon-shelled metal-oxide.

A molecular sieve mixture solution may contain TPABr, $Na_2O$, $Al_2O_3$, $SiO_2$, and $H_2O$, having a molar ratio of $TPABr:Na_2O:Al_2O_3:SiO_2:H_2O$ of about 9.64:8.0:1.0:90:3206.3. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 15 hours) to provide a metal oxide (e.g., $NiFe_2O_4$) loaded ZSM-5-type molecular sieve.

The metal oxide (e.g., $NiFe_2O_4$) loaded MFI (ZSM-5)-type molecular sieve was then processed at a reduction environment, e.g., including 100% hydrogen by volume, at a temperature of about 300° C. for about 24 hours to provide a NiFe alloy loaded ZSM-S type molecular sieve.

Example 7: $Fe_2O_3$ Loaded L-Type Molecular Sieve

In this example, materials used for the synthesis included: $FeCl_3$ (ferric chloride), cellulose, diethyl phosphate choline, chloroform, acetone, silica sol (e.g., having a mass fraction of about 30%). $NaAlO_2$ (sodium aluminate), and KOH (hydroxide potassium).

To form a carbon-shelled metal-oxide nanoparticles, $FeCl_3$ (e.g., about 1 g) and cellulose (e.g., about 0.01 g) were added to a flask (e.g., a three-necked flask), followed by adding water (e.g., about 1 mL) to dissolve $FeCl_3$ and cellulose, and then adding diethyl phosphate choline (e.g., about 1 g) and chloroform (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 72 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by acetone and water having a 1:1 volume ratio), centrifuged, and dried to provide the carbon-shelled metal-oxide.

A molecular sieve mixture solution may contain $K_2O$, $Al_2O_3$, $SiO_2$, and $H_2O$, having a molar ratio of $K_2O:Al_2O_3:SiO_2:H_2O$ of about 10:1:20:400. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor to provide a resultant mixture. The resultant mixture may then be washed, dried, and calcined (e.g., at 550° C. for about 12 hours) to provide a $Fe_2O_3$ loaded L-type molecular sieve.

Figure 12:
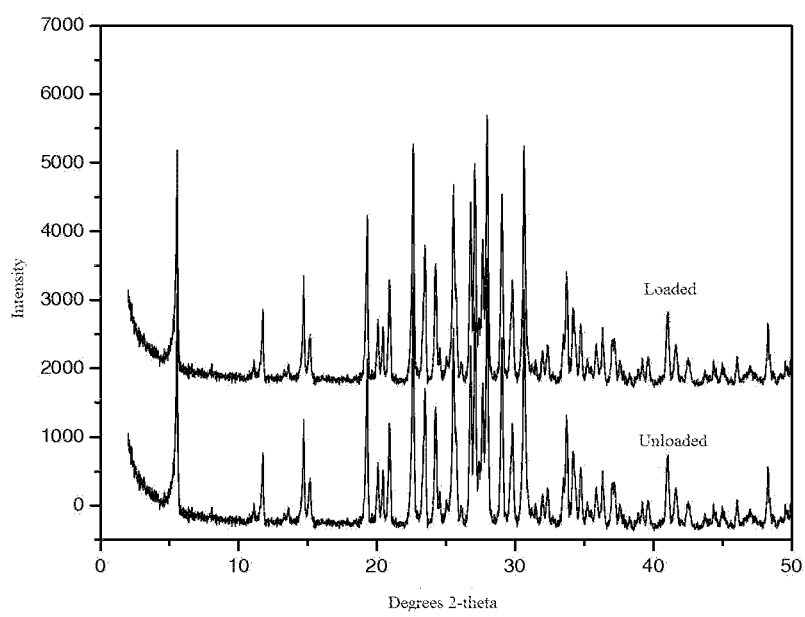
FIG. 12 illustrates XRD data for L-type molecular sieves with no metal oxide $Fe_2O_3$ loaded and with metal oxide $Fe_2O_3$ loaded in accordance with various embodiments of the present disclosure.

FIG. 12 shows XRD data for the L-type molecular sieve before and after loaded with $Fe_2O_3$. As shown, the molecular sieve structure is unchanged.

Example 8: $Fe_2O_3$ Loaded L-Type Molecular Sieve

In this example, materials used for the synthesis included: $FeCl_3$ (ferric chloride), cellulose, diethyl phosphate choline, chloroform, acetone, silica sol (e.g., having a mass fraction of about 30%). $NaAlO_2$ (sodium aluminate), and KOH (hydroxide potassium).

To form a carbon-shelled metal-oxide nanoparticles, $FeCl_3$ (e.g., about 0.05 g) and cellulose (e.g., about 2 g) were added to a flask (e.g., a three-necked flask), followed by adding water (e.g., about 10 mL) to dissolve $FeCl_3$ and cellulose, and then adding diethyl phosphate choline (e.g., about 0.02 g) and chloroform (e.g., about 100 mL) in the flask. The temperature in the flask was increased, e.g., to about 120° C. while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by acetone and water having a 1:10 volume ratio), centrifuged, and dried to provide the carbon-shelled metal-oxide.

A molecular sieve mixture solution may contain $K_2O$, $Al_2O_3$, $SiO_2$, and $H_2O$, having a molar ratio of $K_2O:Al_2O_3:SiO_2:H_2O$ of about 10:1:20:400. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 12 hours) to provide a $Fe_2O_3$ loaded L-type molecular sieve.

Example 9: NiFe Alloy Loaded L-Type Molecular Sieve

In this example, materials used for the synthesis included: $Ni(NO_3)_2$, $FeCl_3$, glucose, CTAB (cetyl trimethyl ammonium bromide), carbon tetrachloride, isopropanol, TPABr (tetrapropylammonium bromide), $NaAlO_2$ (sodium aluminate), KOH (potassium hydroxide) and silica sol (e.g., having a mass fraction of about 30%).

To form a carbon-shelled metal-oxide nanoparticles, $Ni(NO_3)_2$ (e.g., about 0.5 g), $FeCl_3$ (e.g., about 0.5 g), and glucose (e.g., about 0.01 g) were added to a flask (e.g., a three-necked flask), followed by adding water (e.g., about 1 mL) to dissolve $Ni(NO_3)_2$, $FeCl_3$, and glucose, and then adding CTAB (e.g., about 1 g) and carbon tetrachloride (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain $K_2O$, $Al_2O_3$, $SiO_2$, and $H_2O$, having a molar ratio of $K_2O:Al_2O_3$: $SiO_2:H_2O$ of about 10:1:20:400. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 12 hours) to provide a $Fe_2O_3$ loaded L-type molecular sieve.

The metal oxide (e.g., $Fe_2O_3$) loaded L-type molecular sieve was then processed at a reduction environment, e.g., including a mixed gas of $H_2/Ar$ having about 3% hydrogen by volume, at a temperature of about 300° C. for about 24 hours to provide a NiFe alloy loaded L-type molecular sieve. The NiFe alloy loaded L-type molecular sieve can be used as NiFe alloy loaded L-type molecular sieve catalysts.

Figure 13:
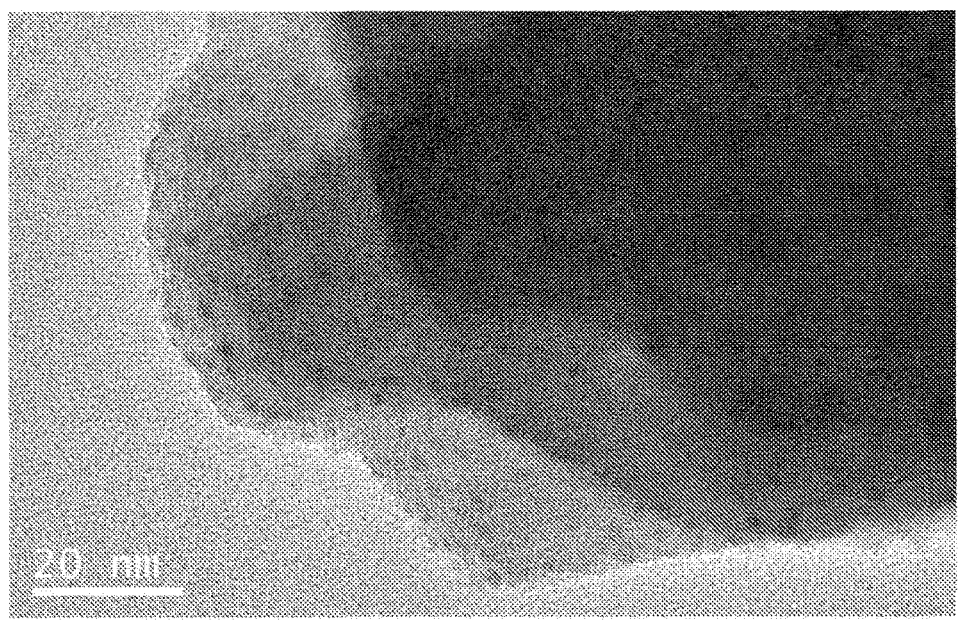
FIG. 13 illustrates a TEM image of a NiFe-loaded L-type molecular sieve in accordance with various embodiments of the present disclosure.

FIG. 13 shows NiFe loaded L-type molecular sieve. As shown, the nanoparticles have a uniform size and may be uniformly distributed in the molecular sieve.

Example 10: NiFe Alloy Loaded L-Type Molecular Sieve

In this example, materials used for the synthesis included: $Ni(NO_3)_2$, $FeCl_3$, glucose, CTAB (cetyl trimethyl ammonium bromide), carbon tetrachloride, isopropanol, TPABr (tetrapropylammonium bromide), $NaAlO_2$ (sodium aluminate), KOH (potassium hydroxide), and silica sol (e.g., having a mass fraction of about 30%).

To form a carbon-shelled metal-oxide nanoparticles, $Ni(NO_3)_2$ (e.g., about 0.025 g), $FeCl_3$ (e.g., about 0.025 g), and glucose (e.g., about 2 g) were added to a flask (e.g., a three-necked flask), followed by adding water (e.g., about 10 mL) to dissolve $Ni(NO_3)_2$, $FeCl_3$, and glucose, and then adding CTAB (e.g., about 0.02 g) and carbon tetrachloride (e.g., about 100 mL) in the flask. The temperature in the flask was increased, e.g., to about 120° C., while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:10 volume ratio), centrifuged, and dried to provide the carbon-shelled metal-oxide.

A molecular sieve mixture solution may contain $K_2O$, $Al_2O_3$, $SiO_2$, and $H_2O$, having a molar ratio of $K_2O:Al_2O_3$: $SiO_2:HO$ of about 10:1:20:400. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 12 hours) to provide a $Fe_2O_3$ loaded L-type molecular sieve.

The metal oxide (e.g., $Fe_2O_3$) loaded L-type molecular sieve was then processed at a reduction environment, e.g., including 100% reducing gas by volume, at a temperature of about 700° C. for about 1 hour to provide a NiFe alloy loaded L-type molecular sieve. The NiFe alloy loaded L-type molecular sieve can be used as NiFe alloy loaded L-type molecular sieve catalysts.

Example 11: CuAg Alloy Loaded L-Type Molecular Sieve

In this example, materials used for the synthesis included: $Cu(NO_3)_2$, $AgNO_3$, sucrose, AOT (dioctyl sodium succinate), petroleum ether, acetone, TPABr (tetrapropylammonium bromide), $NaAlO_2$ (sodium aluminate), KOH (potassium hydroxide), and silica sol (e.g., having a mass fraction of about 30%).

To form a carbon-shelled metal-oxide nanoparticles, $Cu(NO_3)_2$ (e.g., about 0.5 g), $AgNO_3$ (e.g., about 0.5 g), and sucrose (e.g., about 0.01 g) were added to a flask (e.g., a three-necked flask), followed by adding water (e.g., about 1 mL) to dissolve $Cu(NO_3)_2$, $AgNO_3$, and sucrose, and then adding AOT (dioctyl sodium succinate) (e.g., about 1 g) and petroleum ether (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by acetone), centrifuged, and dried to provide the carbon-shelled metal-oxide.

A molecular sieve mixture solution may contain $K_2O$, $Al_2O_3$, $SiO_2$, and $H_2O$, having a molar ratio of $K_2O:Al_2O_3$: $SiO_2:H_2O$ of about 10:1:20:400. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor to provide a resultant mixture. The resultant mixture may then be washed, dried, and calcined (e.g., at 550° C. for about 4 hours) to provide CuAu oxide loaded L-type molecular sieve. The metal CuAu oxide loaded L-type molecular sieve was then processed at a reduction environment, e.g., including a mixed gas of $H_2$/Ar having about 3% hydrogen by volume, at a temperature of about 300° C. for about 24 hours to provide a CuAu alloy loaded L-type molecular sieve. The CuAu alloy loaded L-type molecular sieve can be used as CuAu alloy loaded L-type molecular sieve catalysts.

Example 12: CuAg Alloy Loaded L-Type Molecular Sieve

In this example, materials used for the synthesis included: $Cu(NO_3)_2$, $AgNO_3$, sucrose, AOT (dioctyl sodium succinate), petroleum ether, acetone, TPABr (tetrapropylammonium bromide). $NaAlO_2$ (sodium aluminate), KOH (potassium hydroxide), and silica sol (e.g., having a mass fraction of about 30%).

To form a carbon-shelled metal-oxide nanoparticles, $Cu(NO_3)_2$ (e.g., about 0.025 g), $AgNO_3$ (e.g., about 0.025 g), and sucrose (e.g., about 2 g) were added to a flask (e.g., a three-necked flask), followed by adding water (e.g., about 10 mL) to dissolve $Cu(NO_3)_2$, $AgNO_3$, and sucrose, and then adding AOT (dioctyl sodium succinate) (e.g., about 0.02 g) and acetone (e.g., about 100 mL) in the flask. The temperature in the flask was increased, e.g., to about 120° C., while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by sucrose), centrifuged, and dried to provide the carbon-shelled metal-oxide.

A molecular sieve mixture solution may contain $K_2O$, $Al_2O_3$, $SiO_2$, and $H_2O$, having a molar ratio of $K_2O:Al_2O_3:SiO_2:H_2O$ of about 10:1:20:400. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 4 hours) to provide CuAu oxide loaded L-type molecular sieve. The metal CuAu oxide loaded L-type molecular sieve was then processed at a reduction environment, e.g., including 100% reducing gas by volume, at a temperature of about 700° C. for about 1 hour to provide a CuAu alloy loaded L-type molecular sieve. The CuAu alloy loaded L-type molecular sieve can be used as CuAu alloy loaded L-type molecular sieve catalysts.

Example 13: FePt Alloy Loaded Beta-Type Molecular Sieve

In this example, materials used for the synthesis included: $Fe(NO_3)_3$ (ferric nitrate), $H_2PtCl_6$ (chloroplatinic acid), glucose, CTAB (cetyl trimethyl ammonium bromide), dimethyl sulfoxide, isopropanol, NaOH (sodium hydroxide), TEAOH (tetraethyl ammonium hydroxide), $NaAlO_2$ (sodium aluminate), and silica sol (e.g., having a mass fraction of about 30%).

To form a carbon-shelled metal-oxide nanoparticles, $Fe(NO_3)_3$ (e.g., about 0.5 g), $H_2PtCl_6$ (e.g., about 0.5 g), and glucose (e.g., about 0.01 g) were added to a flask (e.g., a three-necked flask), followed by adding water (e.g., about 1 mL) to dissolve $Fe(NO_3)_3$, $H_2PtCl_6$, and glucose, and then adding CTAB (e.g., about 1 g) and dimethyl sulfoxide (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain $Na_2O$, TEAOH, $Al_2O_3$, $SiO_2$, and $H_2O$, having a molar ratio of $Na_2O:TEAOH:Al_2O_3:SiO_2:H_2O$ of about 0.48:9:0.25:25:295. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 4 hours) to provide FePt oxide loaded beta-type molecular sieve. The metal FePt oxide loaded beta-type molecular sieve was then processed at a reduction environment, e.g., including a mixed gas of $H_2$/Ar having about 3% hydrogen by volume, at a temperature of about 300° C. for about 24 hours to provide a FePt alloy loaded beta-type molecular sieve. The FePt alloy loaded beta-type molecular sieve can be used as FePt alloy loaded beta-type molecular sieve catalysts.

Example 14: FePt Alloy Loaded Beta-Type Molecular Sieve

In this example, materials used for the synthesis included: $Fe(NO_3)_3$ (ferric nitrate), $H_2PtCl_6$ (chloroplatinic acid), glucose, CTAB (cetyl trimethyl ammonium bromide), dimethyl sulfoxide, isopropanol, NaOH (sodium hydroxide), TEAOH (tetraethyl ammonium hydroxide), $NaAlO_2$ (sodium aluminate), and silica sol (e.g., having a mass fraction of about 30%).

To form a carbon-shelled metal-oxide nanoparticles, $Fe(NO_3)_3$ (e.g., about 0.025 g), $H_2PtCl_6$ (e.g., about 0.025 g), and glucose (e.g., about 2 g) were added to a flask (e.g., a three-necked flask), followed by adding water (e.g., about 10 mL) to dissolve $Fe(NO_3)_3$, $H_2PtCl_6$, and glucose, and then adding CTAB (e.g., about 0.02 g) and dimethyl sulfoxide (e.g., about 100 mL) in the flask. The temperature in the flask was increased, e.g., to about 120° C., while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:10 volume ratio), centrifuged, and dried to provide the carbon-shelled metal-oxide.

A molecular sieve mixture solution may contain $Na_2O$, TEAOH, $Al_2O_3$, $SiO_2$, and $H_2O$, having a molar ratio of $Na_2O$:TEAOH:$Al_2O_3$:$SiO_2$:$H_2O$ of about 0.48:9:0.25:25:295. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 4 hours) to provide FePt oxide loaded beta-type molecular sieve. The metal FePt oxide loaded beta-type molecular sieve was then processed at a reduction environment, e.g., including 100% reducing gas by volume, at a temperature of about 700° C. for about 1 hour to provide a FePt alloy loaded beta-type molecular sieve. The FePt alloy loaded beta-type molecular sieve can be used as FePt alloy loaded beta-type molecular sieve catalysts.

Example 15: RuCo Alloy Loaded MFI-Type Pure Silicon Molecular Sieve

In this example, materials used for the synthesis included: $Co(NO)_2$ (cobalt nitrate). $RuCl_3$ (ruthenium trichloride), CTAB (cetyl trimethyl ammonium bromide), ethyl acetate, isopropanol, silica sol (e.g., having a mass fraction of about 30%), and TPAOH (tetrapropyl ammonium hydroxide).

To form a carbon-shelled metal-oxide nanoparticles, $Co(NO_3)_2$ (e.g., about 0.5 g), $RuCl_3$ (e.g., about 0.5 g), and glucose (e.g., about 0.01 g) were added to a flask (e.g., a three-necked flask), followed by adding water (e.g., about 1 mL) to dissolve $Co(NO_3)_3$, $RuCl_3$, and glucose, and then adding CTAB (e.g., about 1 g) and ethyl acetate (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain $SiO_2$, $TPA_2O$, and $H_2O$, having a molar ratio of $SiO_2$:$TPA_2O$:$H_2O$ of about 25:4.5:480. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 300° C. for about 4 hours) to provide RuCo oxide loaded pure silicon-type molecular sieve. The metal RuCo oxide loaded pure silicon-type molecular sieve was then processed at a reduction environment, e.g., including a mixed gas of $H_2$/Ar having about 3% hydrogen by volume, at a temperature of about 300° C. for about 24 hours to provide a RuCo alloy loaded pure silicon-type molecular sieve. The RuCo alloy loaded pure silicon-type molecular sieve can be used as RuCo alloy loaded pure silicon-type molecular sieve catalysts.

Example 16: RuCo Alloy Loaded MFI-Type Pure Silicon Molecular Sieve

In this example, materials used for the synthesis included: $Co(NO_3)_2$ (cobalt nitrate), $RuCl_3$ (ruthenium trichloride), CTAB (cetyl trimethyl ammonium bromide), ethyl acetate, isopropanol, silica sol (e.g., having a mass fraction of about 30%), and TPAOH (tetrapropyl ammonium hydroxide).

To form a carbon-shelled metal-oxide nanoparticles, $Co(NO_3)_2$ (e.g., about 0.025 g), $RuCl_3$ (e.g., about 0.025 g), and glucose (e.g., about 2 g) were added to a flask (e.g., a three-necked flask), followed by adding water (e.g., about 10 mL) to dissolve $Co(NO3)_3$, $RuCl_3$, and glucose, and then adding CTAB (e.g., about 0.02 g) and ethyl acetate (e.g., about 100 mL) in the flask. The temperature in the flask was increased, e.g., to about 120° C., while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:10 volume ratio), centrifuged, and dried to provide the carbon-shelled metal-oxide.

A molecular sieve mixture solution may contain $SiO_2$, $TPA_2O$, and $H_2O$, having a molar ratio of $SiO_2$:$TPA_2O$:$H_2O$ of about 25:4.5:480. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 300° C. for about 4 hours) to provide RuCo oxide loaded pure silicon-type molecular sieve. The RuCo oxide loaded pure silicon-type molecular sieve was then processed at a reduction environment, e.g., including 100% reducing gas by volume, at a temperature of about 700° C. for about 1 hour to provide a RuCo alloy loaded pure silicon-type molecular sieve. The RuCo alloy loaded pure silicon-type molecular sieve can be used as RuCo alloy loaded pure silicon-type molecular sieve catalysts.

Example 17: AuCu Alloy Loaded MFI-Type Titanium Silicon Molecular Sieve

In this example, materials used for the synthesis included: $Cu(NO_3)_2$ (copper nitrate), $HAuCl_4$ (chloroauric acid), glucose, CTAB (cetyl trimethyl ammonium bromide), ethylene dichloride, isopropanol, $TiO_2$ (titanium dioxide), white carbon black (or silica hydrated), and TPAOH (tetrapropyl ammonium hydroxide).

To form a carbon-shelled metal-oxide nanoparticles, $Cu(NO_3)_2$ (e.g., about 0.5 g), $HAuCl_4$ (e.g., about 0.5 g), and glucose (e.g., about 0.01 g) were added to a flask (e.g., a three-necked flask), followed by adding water (e.g., about 1 mL) to dissolve $Cu(NO_3)_2$, $HAuCl_4$, and glucose, and then adding CTAB (e.g., about 1 g) and ethylene dichloride (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain $TiO_2$, $SiO_2$, $TPA_2O$, and $H_2O$, having a molar ratio of $TiO_2:SiO_2$: $TPA_2O:H_2O$ of about 1:33:9:1200. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 300° C. for about 6 hours) to provide CuAu oxide loaded MFI-type titanium silicon molecular sieve. The metal CuAu oxide loaded MFI-type titanium silicon molecular sieve was then processed at a reduction environment, e.g., including a mixed gas of $H_2/Ar$ having about 3% hydrogen by volume, at a temperature of about 300° C. for about 24 hours to provide a CuAu alloy loaded MFI-type titanium silicon molecular sieve. The CuAu alloy loaded MFI-type titanium silicon molecular sieve can be used as CuAu alloy loaded MFI-type titanium silicon molecular sieve catalysts.

Example 18: AuCu Alloy Loaded MFI-Type Titanium Silicon Molecular Sieve

In this example, materials used for the synthesis included: $Cu(NO_3)_2$ (copper nitrate), $HAuCl_4$ (chloroauric acid), glucose, CTAB (cetyl trimethyl ammonium bromide), ethylene dichloride, isopropanol, $TiO_2$ (titanium dioxide), white carbon black (or silica hydrated), and TPAOH (tetrapropyl ammonium hydroxide).

To form a carbon-shelled metal-oxide nanoparticles, $Cu(NO_3)_2$ (e.g., about 0.025 g), $HAuCl_4$ (e.g., about 0.025 g), and glucose (e.g., about 2 g) were added to a flask (e.g., a three-necked flask), followed by adding water (e.g., about 100 mL) to dissolve $Cu(NO_3)_2$, $HAuCl_4$, and glucose, and then adding CTAB (e.g., about 0.02 g) and ethylene dichloride (e.g., about 100 mL) in the flask. The temperature in the flask was increased, e.g., to about 120° C., while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:10 volume ratio), centrifuged, and dried to provide the carbon-shelled metal-oxide.

A molecular sieve mixture solution may contain $TiO_2$, $SiO_2$, $TPA_2O$, and $H_2O$, having a molar ratio of $TiO_2:SiO_2$: $TPA_2O:H_2O$ of about 1:33:9:1200. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 300° C. for about 6 hours) to provide CuAu oxide loaded MFI-type titanium silicon molecular sieve.

The metal CuAu oxide loaded MFI-type titanium silicon molecular sieve was then processed at a reduction environment, e.g., including a 100% $H_2$ by volume, at a temperature of about 700° C. for about 1 hour to provide a CuAu alloy loaded MFI-type titanium silicon molecular sieve. The CuAu alloy loaded MFI-type titanium silicon molecular sieve can be used as CuAu alloy loaded MFI-type titanium silicon molecular sieve catalysts.

Example 19: $MoO_3$ Loaded AFI-Type P—Al Molecular Sieve

In this example, materials used for the synthesis included: $(NH_4)_6Mo_7O_{24}$ (ammonium molybdate), glucose, CTAB (cetyl trimethyl ammonium bromide), xylene, isopropanol, concentrated phosphoric acid (e.g., having a mass fraction of about 85%), TEA (triethylamine), and quasi-boehmite.

To form a carbon-shelled metal-oxide nanoparticles, $(NH_4)_6Mo_7O_{24}$ (e.g., about 1 g) and glucose (e.g., about 0.01 g) were added to a flask (e.g., a three-necked flask), followed by adding water (e.g., about 1 mL) to dissolve $(NH_4)_6Mo_7O_{24}$ and glucose, and then adding CTAB (e.g., about 1 g) and xylene (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain $Al_2O_3$, $P_2O_5$, TEA, and $H_2O$, having a molar ratio of $Al_2O_3:P_2O_5$: $TEA:H_2O=1:1.04:1.5:50$. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 300° C. for about 6 hours) to provide a $MoO_3$ loaded AFI-type P—Al molecular sieve.

Example 20: $MoO_3$ Loaded AFI-Type P—Al Molecular Sieve

In this example, materials used for the synthesis included: $(NH_4)_6Mo_7O_{24}$ (ammonium molybdate), glucose, CTAB (cetyl trimethyl ammonium bromide), xylene, isopropanol, concentrated phosphoric acid (e.g., having a mass fraction of about 85%), TEA (triethylamine), and quasi-boehmite.

To form a carbon-shelled metal-oxide nanoparticles, $(NH_4)_6Mo_7O_{24}$ (e.g., about 0.05 g) and glucose (e.g., about 2 g) were added to a flask (e.g., a three-necked flask), followed by adding water (e.g., about 10 mL) to dissolve $(NH_4)_6Mo_7O_{24}$ and glucose, and then adding CTAB (e.g., about 0.02 g) and xylene (e.g., about 500 mL) in the flask. The temperature in the flask was increased, e.g., to about 120° C., while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:10 volume ratio), centrifuged, and dried to provide the carbon-shelled metal-oxide.

A molecular sieve mixture solution may contain $Al_2O_3$, $P_2O_5$, TEA, and $H_2O$, having a molar ratio of $Al_2O_3:P_2O_5$:$TEA:H_2O=1:1.04:1.5:50$. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 300° C. for about 6 hours) to provide a $MoO_3$ loaded AFI-type P—Al molecular sieve.

Example 21: Pt Loaded SAPO-Series Si—P—Al Molecular Sieve

In this example, materials used for the synthesis included: chloroplatinic acid, glucose, CTAB (cetyl trimethyl ammonium bromide), n-pentanol, isopropanol, quasi-boehmite, concentrated phosphoric acid (e.g., having a mass fraction of about 85%), silica sol (30% mass fraction), and TEA (triethylamine).

To form a carbon-shelled metal-oxide nanoparticles, $H_2PtCl_6$ (e.g., about 1 g) and glucose (e.g., about 0.01 g) were added to a flask (e.g., a three-necked flask), followed by adding water (e.g., about 1 mL) to dissolve $H_2PtCl_6$ and glucose, and then adding CTAB (e.g., about 1 g) and n-pentanol (e.g., about 500 mL) in the flask. The temperature in the flask was increased, e.g., to about 50° C., while being stirred by a magnetic stirrer, e.g., for about 72 hours. The temperature in the flask was continuously increased to form an azeotropes, e.g., for about 24 hours, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:1 volume ratio), centrifuged, and dried to provide the carbon-shelled metal-oxide.

A molecular sieve mixture solution may contain $Al_2O_3$, $P_2O_5$, $SiO_2$, TEA, and $H_2O$, having a molar ratio of $Al_2O_3$:$P_2O_5:SiO_2:TEA:H_2O=1:1:0.6:3:60$. Such molecular sieve mixture solution is then stirred to be homogenous. The carbon-shelled metal-oxide was added into the molecular sieve mixture solution, for example, having a concentration of about 0.1% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 6 hours) to provide a PtO loaded SAPO-34 Si—P—Al molecular sieve.

The PtO loaded SAPO-34 Si—P—Al molecular sieve was then processed at a reduction environment, e.g., including a mixed gas atmosphere of $H_2$/Ar having about 3% volume fraction of reducing gas by volume, at a temperature of about 300° C. for about 24 hours to provide a Pt loaded SAPO-34 Si—P—Al molecular sieve. The Pt loaded SAPO-34 Si—P—Al molecular sieve can be used as Pt loaded SAPO-34 Si—P—Al molecular sieve catalysts.

Example 22: Pt Loaded SAPO-Series Si—P—Al Molecular Sieve

In this example, materials used for the synthesis included: chloroplatinic acid, glucose, CTAB (cetyl trimethyl ammonium bromide), n-pentanol, isopropanol, quasi-boehmite, concentrated phosphoric acid (e.g., having a mass fraction of about 85%), silica sol (e.g., having a mass fraction of about 30%), and TEA (triethylamine).

To form a carbon-shelled metal-oxide nanoparticles, $H_2PtCl_6$ (e.g., about 0.05 g) and glucose (e.g., about 2 g) were added to a flask (e.g., a three-necked flask), followed by adding water (e.g., about 10 mL) to dissolve $H_2PtCl_6$ and glucose, and then adding CTAB (e.g., about 0.02 g) and n-pentanol (e.g., about 100 mL) in the flask. The temperature in the flask was increased, e.g., to about 120° C., while being stirred by a magnetic stirrer, e.g., for about 1 hour. The temperature in the flask was continuously increased to form an azeotropes, e.g., for about 1 hour, to remove water to form a mixture. The mixture after removing water was placed in a reactor, such as a PTFE-lined stainless steel reactor, for a hydrothermal reaction to provide a resultant mixture. The resultant solution after the hydrothermal reaction was washed (e.g., by isopropanol and water having a 1:10 volume ratio), centrifuged, and dried to provide the carbon-shelled metal-oxide.

A molecular sieve mixture solution may contain $Al_2O_3$, $P_2O_5$, $SiO_2$, TEA, and $H_2O$, having a molar ratio of $Al_2O_3$:$P_2O:SiO_2:TEA:H_2O=1:1:0.6:3:60$. Such molecular sieve mixture solution is then stirred to be homogenous. The carbon-shelled metal-oxide was added into the molecular sieve mixture solution, for example, having a concentration of about 30% by mass of the total of the molecular sieve mixture solution. The molecular sieve mixture solution containing carbon-shelled metal-oxide was then thoroughly stirred and then placed in a reactor, such as a PTFE-lined stainless steel reactor, for a hydrothermal reaction to provide a resultant mixture. The resultant mixture may then be washed, dried, and calcined (e.g., at 550° C. for about 6 hours) to provide a PtO loaded SAPO-34 Si—P—Al molecular sieve.

The PtO loaded SAPO-34 Si—P—Al molecular sieve was then processed at a reduction environment, e.g., including 100% reducing gas by volume, at a temperature of about 700° C. for about 1 hour to provide a Pt loaded SAPO-34 Si—P—Al molecular sieve. The Pt loaded SAPO-34 Si—P—Al molecular sieve can be used as Pt loaded SAPO-34 Si—P—Al molecular sieve catalysts.

As such, to form carbon-shelled metal-oxide (or carbon-shelled metal-oxide nanoparticles), micro-emulsion reaction system is used to use an organic solvent as a continuous phase, to use an aqueous solution including metal salt, water-soluble organic carbon source as a dispersed phase and also as a water-based core for subsequently forming a core-shell structure. A surfactant is then added to form a water-in-oil type micro-emulsion system. Water may then be removed by azeotropic distillation from the micro-emulsion system, followed by a high temperature reaction to carbonize the organic carbon source to form carbon-shelled metal-oxide nanoparticles each having a core-shell structure. After washed with, for example, isopropanol, ethanol, acetone, water and other suitable solvents, and after a centrifugation process, carbon-shelled metal-oxide nanoparticles may be obtained.

In various embodiments, by adjusting mass ratio between water and metal salt, mass ratio between surfactant and water, volume ratio between the organic solvent of the continuous phase and water, metal-oxide nanoparticles having a diameter of 1-100 nm may be obtained. The thickness of the carbon shell layer may be controlled or adjusted by the mass ratio between the organic carbon source and the metal salt.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A method for preparing a molecular sieve catalyst, comprising:
    preparing a water-in-oil micro-emulsion including a continuous phase containing an organic solvent and a dispersed phase containing an aqueous solution containing one or more metal salts and a water-soluble organic carbon source;
    hydrolyzing and azeotropically distilling the water-in-oil micro-emulsion to form a mixture solution;
    heating the mixture solution to carbonize the water-soluble organic carbon source to form nanoparticles each having a core-shell structure including carbon-shelled metal-oxide;
    dispersing the nanoparticles containing the carbon-shelled metal-oxide in a molecular sieve precursor solution;
    forming a nanoparticle-loaded molecular sieve from the molecular sieve precursor solution containing the nanoparticles; and
    calcining the nanoparticle-loaded molecular sieve to remove carbon from the nanoparticles containing the carbon-shelled metal-oxide and to form a metal-oxide loaded molecular sieve.

2. The method according to claim 1, further comprising:
    placing the metal-oxide loaded molecular sieve in a reduction environment to reduce metal oxide in the nanoparticle-loaded molecular sieve to form a molecular sieve loaded with one or more of metal, metal alloy, and intermetallic compound.

3. The method according to claim 2, wherein:
    the reduction environment includes a reducing gas selected from a group of carbon monoxide and hydrogen, and
    a concentration of the reducing gas ranges from about 3% to about 100% by volume.

4. The method according to claim 1, wherein:
    the water-in-oil micro-emulsion further includes a surfactant, and
    the surfactant includes a cationic surfactant including cetyl trimethyl ammonium bromide, an anionic surfactant including sodium dioctyl succinate, a nonionic surfactant including diethyl glucose amide, and a zwitterionic surfactant including diethyl phosphate choline.

5. The method according to claim 4, wherein:
    a mass ratio of the surfactant over water in the water-in-oil micro-emulsion is about 1:1 to about 1:500.

6. The method according to claim 1, wherein:
    a mass ratio of the water-soluble organic carbon source over the one or more metal salts in the water-in-oil micro-emulsion is about 0.01:1 to about 200:1.

7. The method according to claim 1, wherein:
    a mass ratio of water over the one or more metal salts in the water-in-oil micro-emulsion is about 1:1 to about 500:1.

8. The method according to claim 1, wherein:
    the organic solvent in the continuous phase includes one or more selected from a group of benzene, toluene, chloroform, carbon tetrachloride, petroleum ether, dimethyl sulfoxide, ethyl acetate, ethylene dichloride, xylene, and n-pentanol.

9. The method according to claim 1, wherein:
    a metal in each of the one or more metal salts and the carbon-shelled metal-oxide includes one or more selected from a group of Fe, Co, Ni, Cu, Ag, Au, Zn, Pd, Pt, Ce, Ti, Si, Cr, Mn, W, Zr, Nb, Mo, Ru, Rh, Cd, Sn, Y, La, and V.

10. The method according to claim 9, wherein:
    the metal salt includes one or more selected from a group of ferric nitrate, nickel nitrate, ferric chloride, zinc nitrate, zinc chloride, cobalt nitrate, copper nitrate, copper chloride, silver nitrate, ammonium molybdate, and chloroplatinic acid.

11. The method according to claim 1, wherein the step of hydrolyzing and azeotropically distilling the water-in-oil micro-emulsion includes:
    hydrolyzing the water-in-oil micro-emulsion at a temperature of about 50° C. to about 150° C. for about 0.5 hour to about 72 hours, and
    azeotropically distilling by heating to remove water from the hydrolyzed and azeotropically distilled water-in-oil micro-emulsion to form the mixture solution.

12. The method according to claim 11, wherein the step of azeotropically distilling includes:
    an azeotropic system with water, wherein the azeotropic system includes a binary or ternary azeotropic system including one or more selected from a group of benzene, toluene, chloroform, carbon tetrachloride, n-butanol, isobutanol, n-pentanol, isopentanol, acrylonitrile, xylene acetonitrile, isopropanol, ethyl ether, chlorine ethanol, carbon disulfide, formic acid, and ethyl acetate.

13. The method according to claim 1, wherein:
the water-soluble organic carbon source includes one or more selected from a group of glucose, sucrose, and cellulose.

14. The method according to claim 1, wherein the step of heating the mixture solution to carbonize the water-soluble organic carbon source includes:
heating the mixture solution to perform to carbonize the water-soluble organic carbon source at temperature of about 100° C. to about 200° C. for about 1 hour to about 24 hours.

15. The method according to claim 1, wherein the nanoparticles containing the carbon-shelled metal-oxide include monodispersed nanoparticles.

16. The method according to claim 1, after the step of heating the mixture solution to carbonize the water-soluble organic carbon source, further including:
washing the nanoparticles containing the carbon-shelled metal-oxide using an organic solvent, the organic solvent including one or more of isopropanol, ethanol, acetone, and water, and
centrifuging the washed nanoparticles containing the carbon-shelled metal-oxide.

17. The method according to claim 1, wherein:
the nanoparticles containing the carbon-shelled metal-oxide are dispersed in the molecular sieve precursor solution have a mass concentration of about 0.1% to 30% of a total mass of the molecular sieve precursor solution.

18. The method according to claim 1, wherein the step of forming a nanoparticle-loaded molecular sieve from the molecular sieve precursor solution includes:
a hydrothermal method, a dry gel method, or a microwave method.

* * * * *